United States Patent
Haenel et al.

(10) Patent No.: US 8,423,553 B2
(45) Date of Patent: *Apr. 16, 2013

(54) GRAPHICALLY DISPLAYING A FILE SYSTEM

(75) Inventors: Walter Haenel, Boeblingen (DE); Andreas Prokoph, Boeblingen (DE); Thomas Stober, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/416,233

(22) Filed: Mar. 9, 2012

(65) Prior Publication Data

US 2012/0173529 A1 Jul. 5, 2012

Related U.S. Application Data

(63) Continuation of application No. 12/910,259, filed on Oct. 22, 2010.

(30) Foreign Application Priority Data

Oct. 30, 2009 (EP) .................................. 09174554

(51) Int. Cl.
*G06F 7/00* (2006.01)
*G06F 17/30* (2006.01)
*G06F 12/00* (2006.01)

(52) U.S. Cl.
USPC .......................................... 707/737; 707/828

(58) Field of Classification Search ................. 707/828, 707/737
See application file for complete search history.

(56) References Cited

U.S. PATENT DOCUMENTS

| 5,613,122 A * | 3/1997 | Burnard et al. ................... 713/1 |
| 6,055,515 A | 4/2000 | Consentino et al. |
| 7,149,729 B2 | 12/2006 | Kaasten et al. |
| 2002/0147805 A1* | 10/2002 | Leshem et al. ................ 709/223 |
| 2003/0103088 A1* | 6/2003 | Dresti et al. .................. 345/835 |
| 2003/0115218 A1 | 6/2003 | Bobbitt et al. |
| 2006/0004692 A1* | 1/2006 | Kaasten et al. ................... 707/1 |
| 2006/0031263 A1 | 2/2006 | Arrouye et al. |
| 2007/0250785 A1* | 10/2007 | Nakamura et al. ............ 715/764 |
| 2008/0141126 A1 | 6/2008 | Johnson et al. |
| 2008/0189629 A1* | 8/2008 | Diederiks et al. ............. 715/762 |
| 2009/0228785 A1 | 9/2009 | Creekbaum et al. |

FOREIGN PATENT DOCUMENTS

EP  1548615 A1  6/2006

OTHER PUBLICATIONS

C. Brown, "Managing Your Files and Folders With Mindmanager 8", http://mindmapblog.com/?p=1281, May 7, 2009, pp. 1-4.

(Continued)

*Primary Examiner* — Charles Lu
(74) *Attorney, Agent, or Firm* — A. Bruce Clay

(57) ABSTRACT

The contents of a computer file system are displayed on a graphical user interface. File system metadata descriptive of the computer file system and file metadata descriptive of each of a plurality of files are gathered. A file selection is received indicating a file accessed by the user. A user context is determined by the file metadata. The files are clustered using the file system metadata, a set of file metadata, and the user context. The set of file clusters are mapped onto a visualization model and graphically displayed on the graphical user interface using the visualization model.

7 Claims, 8 Drawing Sheets

OTHER PUBLICATIONS

S. Hayduk, "Moving Beyond Information Hierarchies: An Introduction to Dynamic Mind Mapping", http://blog.thebrain.com/beyond-hierarchies, May 6, 2008, pp. 1-11.

A. Wilcox, "Mindmanager Add Ins and Other Related Software", http://www.applications.cabre.co.uk/2009/06/mindmanager-add-ins-and-other-related/, Jun. 9, 2009.

U.S. Appl. No. 12/910,259—Non-Final Office Action Mailed Apr. 25, 2012.

U.S. Appl. No. 12/910,259—Final Office Action Mailed Aug. 23, 2012.

* cited by examiner

GRAPHICALLY DISPLAYING A FILE SYSTEM

The present application is a continuation of U.S. patent application Ser. No. 12/910,259, filed on Oct. 22, 2010, and entitled, "Graphically Displaying a File System," which is incorporated herein by reference.

BACKGROUND

The invention relates to computer file systems, and in particular, to the display of computer file systems using a visualization model.

Computer file systems are typically arranged as hierarchical folder structures. Users manage the data and files in the file system by creating and managing folders and files. Information and files can be organized into a folder hierarchy by sorting them into folders and sub folders.

This method of sorting data works well for a small number of files. As the number of files increases, it can become increasingly difficult to locate files which contain important information. Additionally, if the projects that a user is working on changes, the arrangement of files in the folder hierarchy may not be optimal. For example, a particular file may contain information relevant to several different projects or tasks which a user may need to complete. Placing files into a folder hierarchy may not provide the flexibility needed for optimal productivity by a user.

BRIEF SUMMARY

According to one embodiment of the present invention, a method graphically displays content of a computer file system on a graphical user interface. File system metadata is gathered using a processor, wherein the file system metadata is descriptive of the computer file system, and the computer file system comprises a plurality of files. A set of file metadata is gathered using the processor, wherein the file metadata is descriptive of each of the plurality of files.

A file selection is received from a user, wherein the file selection indicates a file accessed by the user. A user context is determined using the processor, wherein the user context is determined by the file metadata of the file. The plurality of files are clustered into file clusters using the file system metadata, the set of file metadata, and the user context. The set of file clusters is mapped with the processor onto a visualization model. The contents of the computer file system are graphically displayed on the graphical user interface using the visualization model.

According to one embodiment of the present invention, a computer program product graphically displays contents of a computer file system on a graphical user interface. The computer program product comprises a computer readable storage medium having computer readable program code embodied therewith. Computer readable program code is configured to gather file system metadata, wherein the file system metadata is descriptive of the computer file system, and wherein the computer file system comprises a plurality of files. Computer readable program code is configured to gather a set of file metadata, wherein the file metadata is descriptive of each of the plurality of files. Computer readable program code is configured to receive a file selection from a user, wherein the file selection indicates a file accessed by the user. Computer readable program code is configured to determine a user context, wherein the user context is determined by the file metadata of the file. Computer readable program code is configured to cluster the plurality of files into file clusters using the file system metadata, the set of file metadata, and the user context. Computer readable program code is configured to map the set of file clusters onto a visualization model. Computer readable program code is configured to graphically display the contents of the computer file system on the graphical user interface using the visualization model.

According to one embodiment of the present invention, a computer system displays contents of a computer file system on a graphical user interface. A processor is programmed to gather file system metadata, wherein the file system metadata is descriptive of the computer file system, and wherein the computer file system comprises a plurality of files. The processor is programmed to gather a set of file metadata, wherein the file metadata is descriptive of each of the plurality of files. The processor is programmed to receive a file selection from a user, wherein the file selection indicates a file accessed by the user. The processor is programmed to determine a user context, wherein the user context is determined by the file metadata of the file. The processor is programmed to cluster the plurality of files into file clusters using the file system metadata, the set of file metadata, and the user context. The processor is programmed to map the set of file clusters onto a visualization model. The processor is programmed to graphically display the contents of the computer file system on the graphical user interface using the visualization model.

DETAILED DESCRIPTION

Figure 1:
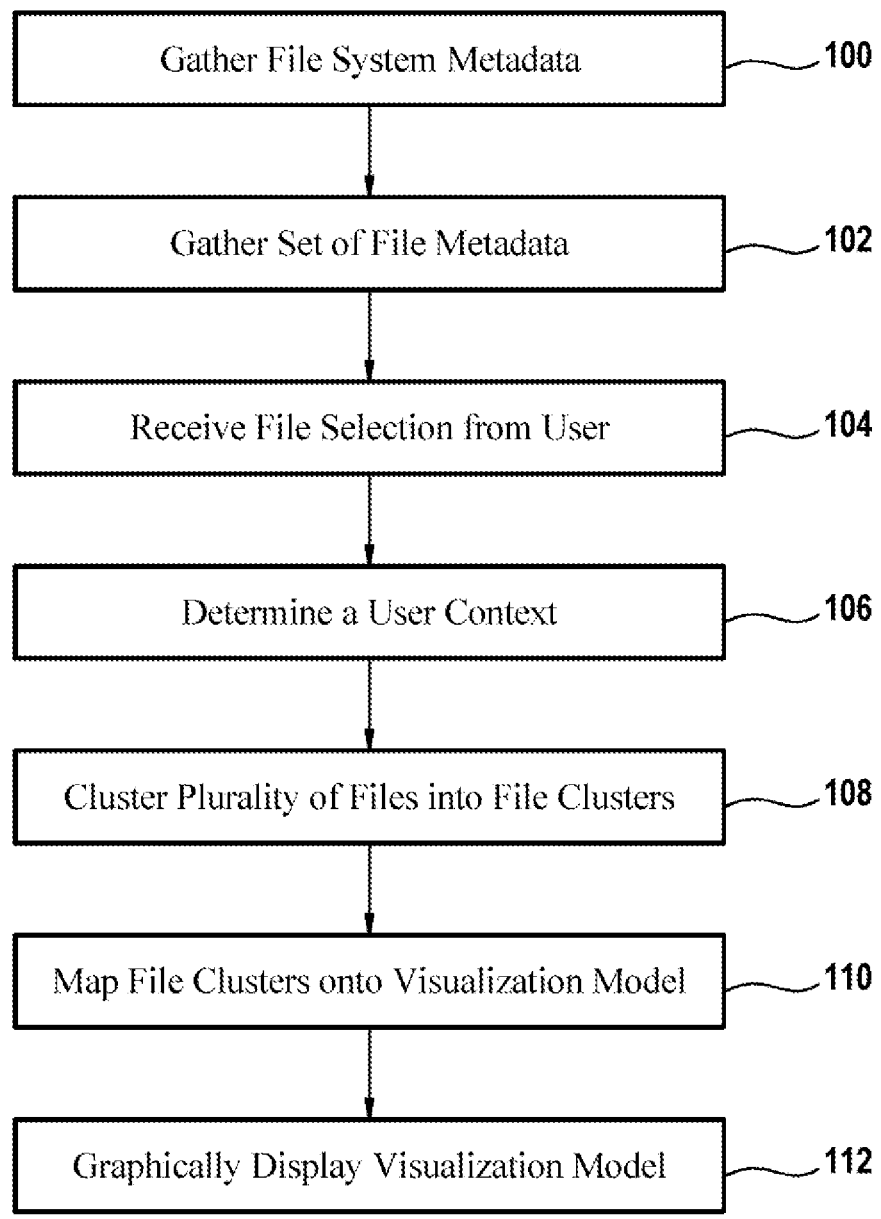
FIG. 1 shows a computer implemented method according to an embodiment of the invention.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the following, like numbered elements in these figures are either similar elements or perform an equivalent function. Elements which have been discussed previously will not necessarily be discussed in later figures if the function is equivalent.

FIG. 1 shows a computer implemented method according to an embodiment of the invention. In step 100 file system metadata is gathered. In step 102 a set of file metadata is gathered. This may be metadata that exists in headers or a database about files, or the file metadata may be gathered by a computer program or process which examines the files. File metadata may also be gathered when files are accessed by a user.

For example, information about when files are accessed could be recorded and used to calculate a correlation between files to indicate a relevance or connection between the files. In step 104 a file selection is received from the user. A file selection occurs when a user selects a file to open or when a file is selected through an application program. In step 106 a user context is determined. The user context is descriptive of the current use or tasks that a user is performing while using the computer or computer system.

A user context can be determined in several different ways. For example, the file selected by the user has certain metadata that may be associated with it and that can be used to determine the user context. A user profile may also be used to determine or partially determine a user context. The user profile may contain information about the user or a historical record determined from past use of files, applications, or a computer. The user context may also be determined or partially determined by an application program in use by the user. In step 108 the plurality of files, which are contained in the file system and are described by the set of file metadata, are gathered into file clusters. This would be performed by a clustering algorithm. In step 110 the file clusters and any relationships between the file clusters which have been identified are mapped onto a visualization model. Then, finally, in step 112, the visualization model is graphically displayed on a graphical user interface.

Figure 2:
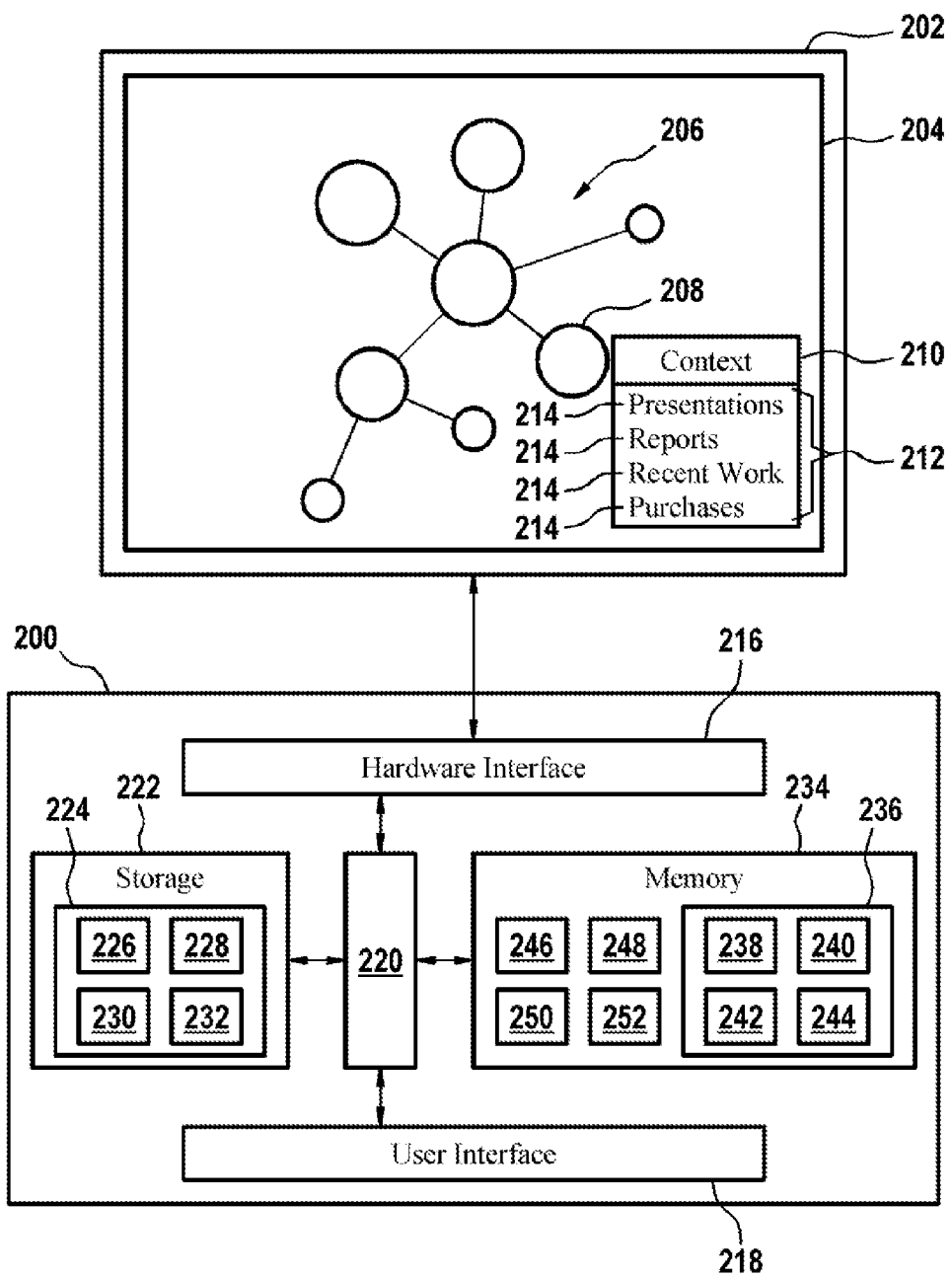
FIG. 2 depicts a functional diagram of a computational appliance adapted for performing an embodiment of a computer implemented method according to the invention.

FIG. 2 depicts a functional diagram of a computational appliance adapted for performing one embodiment of the invention. The computational appliance 200 is also adapted for executing a computer program product according to an embodiment of the invention. The computational appliance 200 is connected to a display apparatus 202. The display apparatus 202 is adapted for displaying a graphical user interface 204. A display apparatus, as used herein, is an apparatus which is adapted for graphically displaying information or pictures. Examples are, but not limited to, a computer monitor, a liquid crystal display, an organic light emitting diode display, a television display, and a cathode ray tube.

Within the graphical user interface 204 there is a graphical representation 206 of a file system 224. In this example, there is a file cluster 208 which has a dropdown box 210 associated with it. With the dropdown box 210, a user is able to select an element 214 from a set of similarities 212. The computational appliance 200 comprises a hardware interface 216 and a user interface 218. The hardware interface 216 is adapted for connecting the computational appliance 200 to a display apparatus 202.

In some computational appliances, such as a laptop or a cellular telephone, the display apparatus 202 is integrated into a single unit with the computational appliance 200. In other examples of a computational appliance, the display apparatus 202 may be separate from the computational appliance 200, for instance, if the computational appliance 200 is a computer, the display apparatus 202 may be a separate computer screen. The user interface 218 allows an operator to interact with the computational appliance 200. In some instances, the user interface 218 may be a separate device, such as a computer mouse or keyboard. In other instances the user interface may be integrated into the display apparatus 202. For instance, the display apparatus 202 may comprise a touch screen or a light sensitive pen for the user to interact with the graphical user interface 204.

The computational appliance also comprises a central processing unit (CPU) 220. The CPU 220 is adapted for executing machine executable instructions. The CPU 220 is connected to the hardware interface 216 and the user interface 218. The computational appliance 200 also has storage 222. This may be physical storage such as a floppy or hard drive, but it may also be stored in the form of computer memory such as flash or random access memory. The computer storage 222 has a file system 224. Within the file system 224 are located files 230 and 232. These represent files. Also located within the file system 224 is a database 226. The database 226 may be used to store data used by a computer program product 236 for implementing an embodiment of the invention.

The use of a database is beneficial because file system metadata and a set of file metadata do not need to be gathered each time the computer system is used. The file system 224 may also contain a profile 228 of the user. The computational appliance 200 also comprises computer memory 234 which is accessible by the CPU 220. The memory 234 may represent memory that is physically separate from the CPU 220, or it may also be memory which is located as part of the CPU 220. The computer memory 234 is adapted for storing a computer program product 236 according to an embodiment of the invention. In this embodiment the computer program product 236 comprises a clustering module 238 for clustering the plurality of files.

The computer program product 236 also comprises a visualization module 240. The visualization module 240 is adapted for mapping the set of file clusters onto a visualization model. The computer program product 236 may also comprise a text analytic component or module 242. The text analytic component or module 242 is adapted for examining files such as file 230 and file 232 to obtain file metadata from text comprising a file. The computer program product 236 may also comprise a programming interface hook 244, which will be subsequently explained in greater detail. The memory 234 may also comprise an operating system 246, a set of file metadata 248, and file system metadata 252.

The computer memory may also hold a file system programming interface 250. The file system programming interface allows the operating system 246 or application programs to manipulate files in the file system or also to display file system information on the graphical user interface 204. The programming interface hook 244 is computer executable code used to replace a portion of the functionality of the file system programming interface 250. Many computer operating systems and file systems use object oriented or functions which can be referenced by a pointer to call functions. By overloading a function or by replacing its pointer, an alternative function or set of code can be used to replace the original code. In this way the programming interface hook 244 can be reused to replace some or all of the functionality of the file system programming interface 250. In this way the computer program product 236 can use the programming interface hook 244 to replace a normal hierarchical display of a file system 244 with a graphical representation 206 of a file system.

Figure 3:
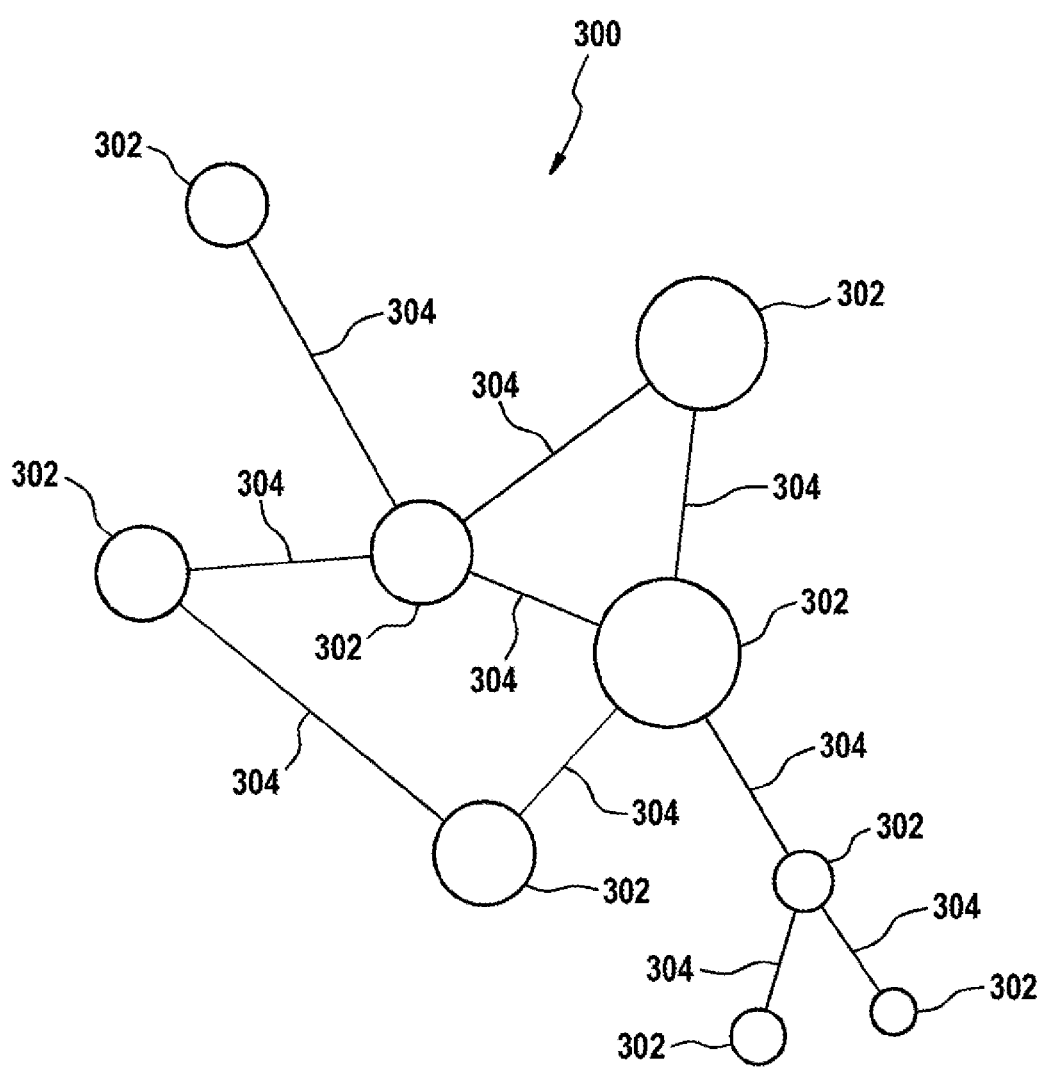
FIG. 3 illustrates an embodiment of a network visualization module.

FIG. 3 depicts an example of a network visualization module 300. The network visualization module comprises network nodes 302 and network connections 304. The network connections 304 connect network nodes 302 to each other. The network nodes are used to represent file clusters. The network connections 304 may be used to represent connections or similarities between file clusters. The size of a network node 302 may indicate the number of files contained therein.

Figure 4:
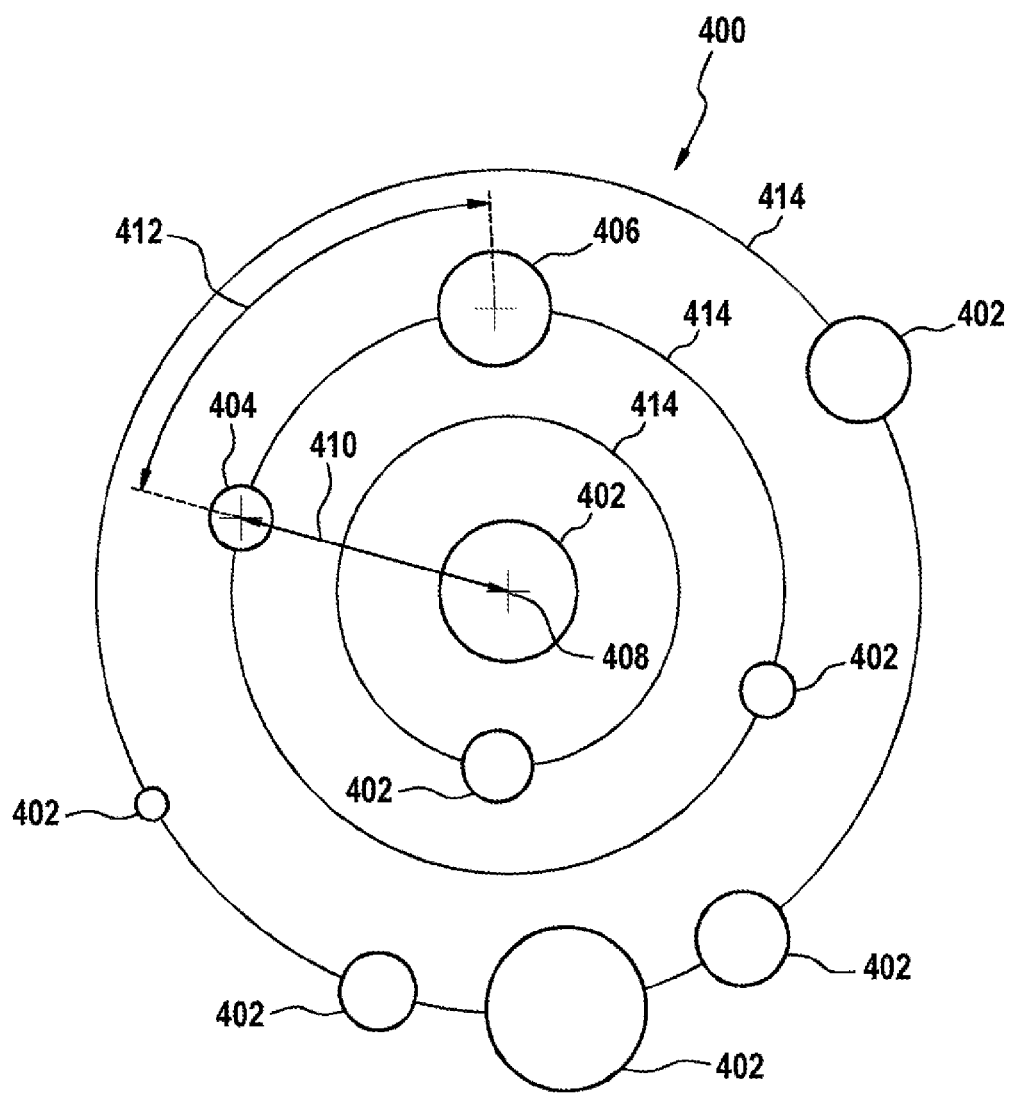
FIG. 4 illustrates an embodiment of an orbital visualization model.

FIG. 4 illustrates an example of an orbital visualization model according to an embodiment of the invention. In the orbital visualization model 400, planets 402, 404, and 406 are located around a center 408. In this model the distance of a planet 402, 404, 406 to the center 408 may indicate how relevant a particular planet is to a particular context or search result. In this visualization model the planets 402, 404, and 406 are used to represent file clusters. Their proximity to the center 408 indicates their relevance to a particular user context.

The planets may also be optionally located on orbits 414. The orbits may be used to connect planets and may be labeled or use symbols to indicate common elements or context between the planets 402, 404, and 406. Line 410 indicates the distance between the center 408 and planet 404. The distance 410 may be taken as a measure of the relevance of a particular file cluster 404 to a particular user context. In addition to using orbital lines 414 to show connections between planets 402, 404, and 406, the distance between planets may also indicate a relationship, therebetween. This may be an absolute distance, or it may also be an angular distance. The line 412 indicates a distance along an arc between planet 404 and 406. An angular measure, a distance along an arc 412, or an absolute distance between planets or the planet centers may indicate a relationship between file clusters.

Figure 5:
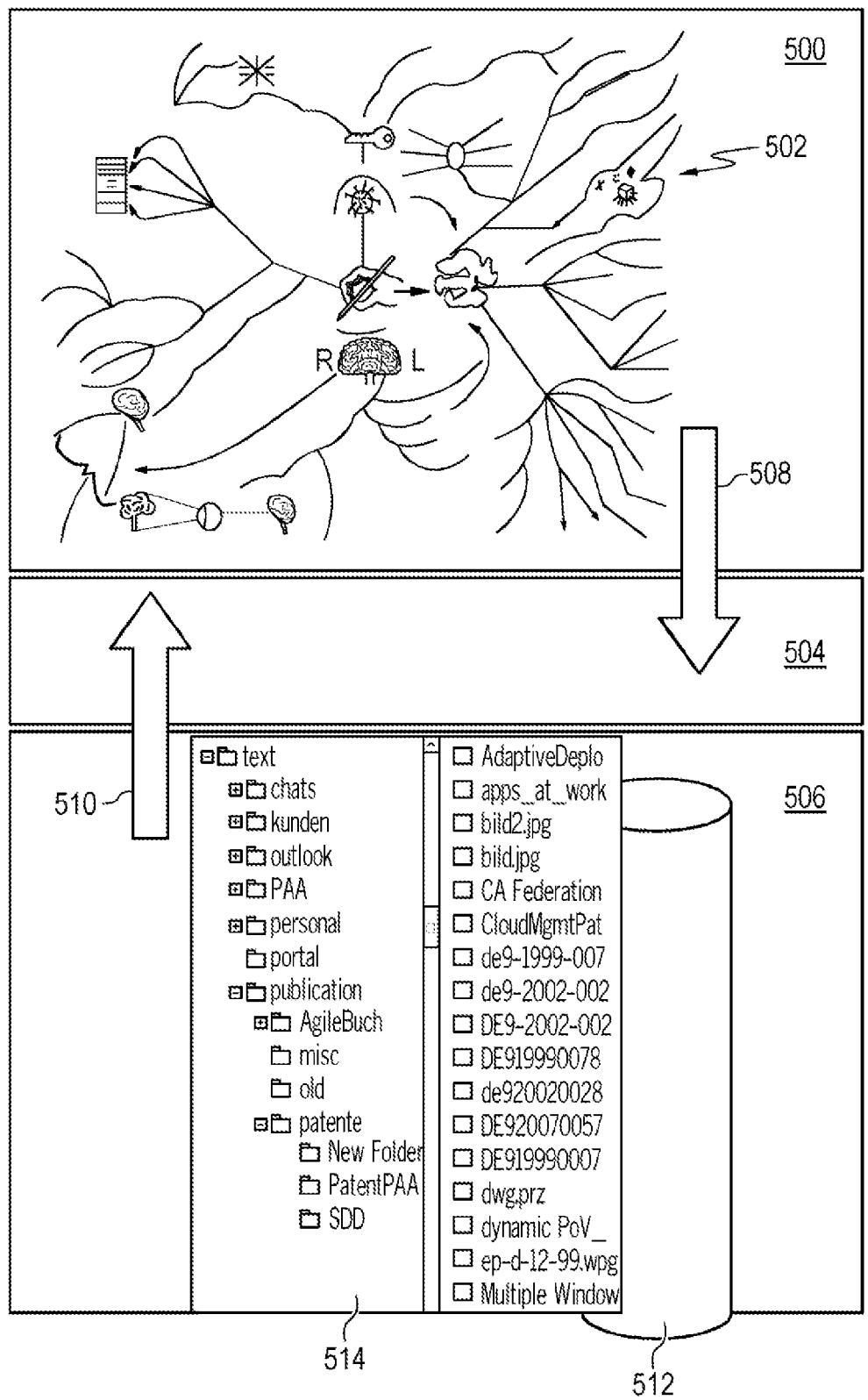
FIG. 5 depicts a an implementation of a virtual file system according to an embodiment of the invention.

FIG. 5 illustrates an implementation of a virtual file system 500 which uses a computer implemented method according to an embodiment of the invention. The virtual file system 500 is visualized using a mind map 502. Shown is a data analyzer 504. The data analyzer may be implemented as a computer program product. Also shown is a physical file system 506. The physical file system 506 has a storage medium 512. To illustrate the contrast in using a mind map 502, a hierarchical representation of the file system 514 is shown next to the storage medium 512. The data analyzer 504 or computer program product is able to reflect usage patterns 508 by a user. This may be achieved through recording notifications of which file system item or file is accessed by a user. The data analyzer 504 is also able to gather a set of file metadata by crawling through and analyzing data 510.

An application may go through the file system or crawl through it and pick up relevant files such as documents, textual content, source code and other files. It may extract information such as metadata and attributes of the file such as the title, the keywords, author, access dates and times and links within the file. The crawled and analyzed data may also involve indexing and storing this metadata in a search collection or a database. The data may be stored in a database or it may be simply stored in an index or in a file.

Figure 6:
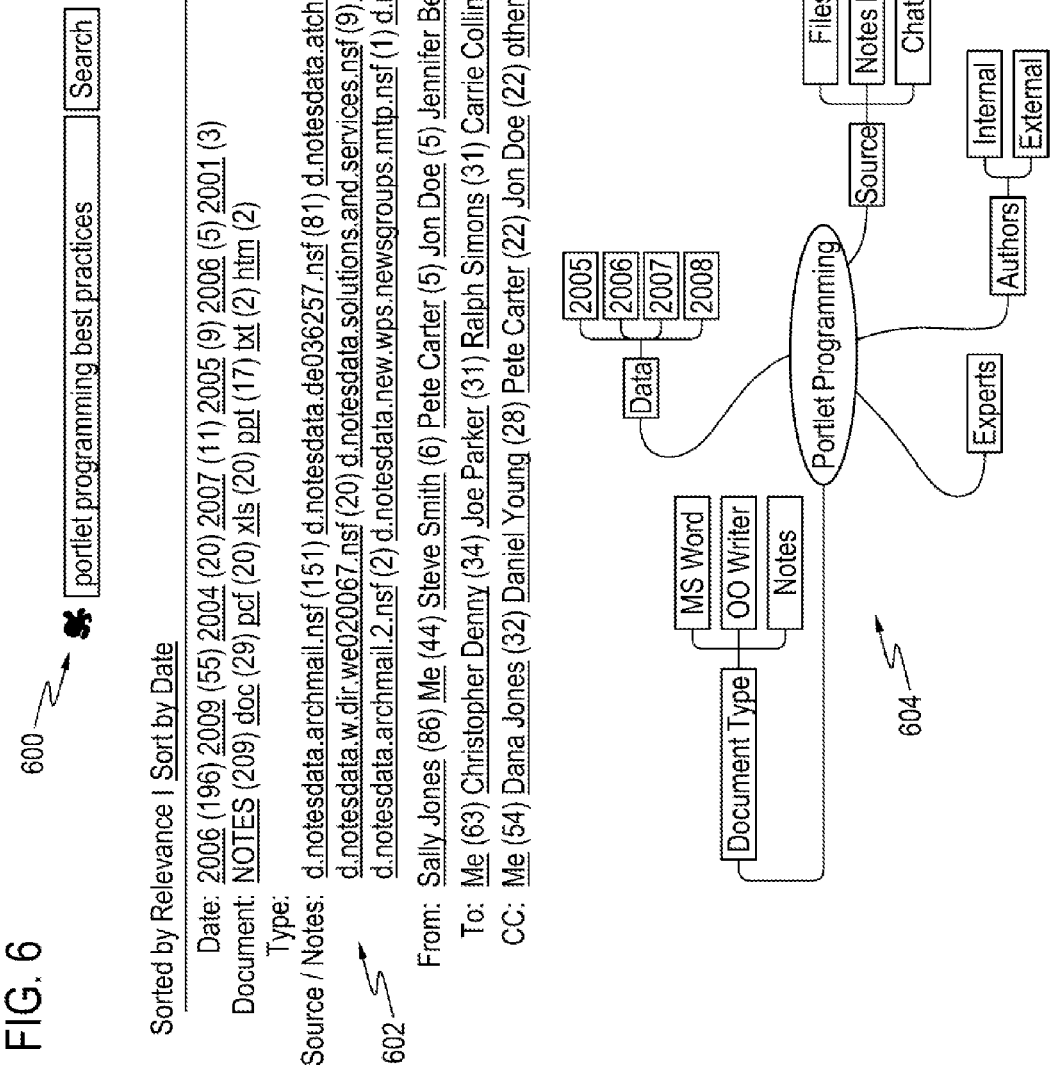
FIG. 6 illustrates how a user search query can be used to generate a graphical display of a file system according to an embodiment of the invention.

FIG. 6 illustrates how a user search query can be used to generate a graphical display of a file system. In box 600 a user would type a search term. In the text block represented by 602 the computer system or computer program product has performed a search and then analyzes the returned result information. Here a sample list of metadata is grouped through faceted search technology. Finally, in step 604 a mind map is built using the list of metadata that was grouped in text block labeled 602.

Figure 7:
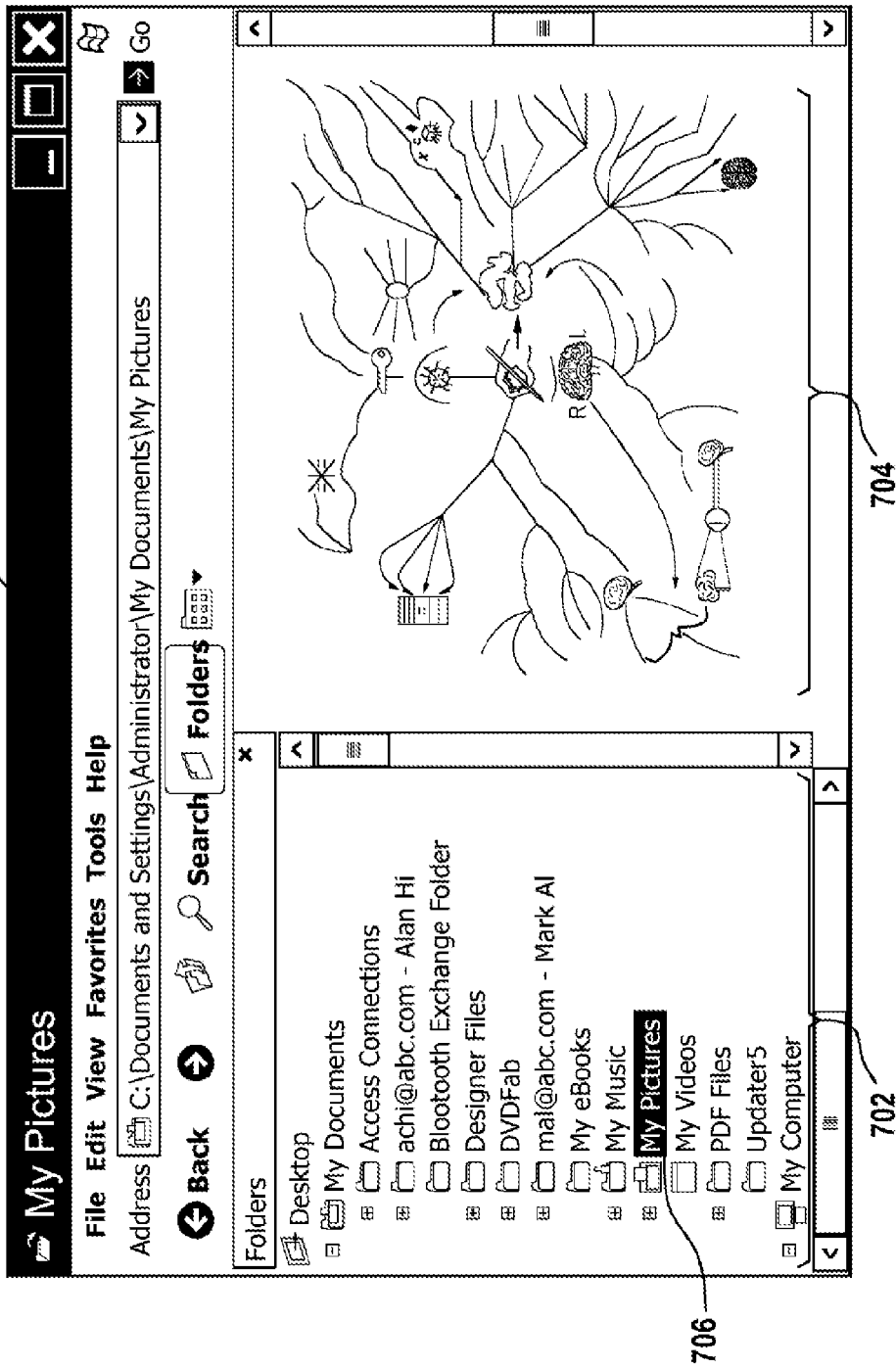
FIG. 7 illustrates an embodiment of the invention integrated into Microsoft Windows.

FIG. 7 shows an example of how an embodiment of the invention may be integrated into an operating system such as Microsoft® Windows® (Microsoft and Windows are trademarks of Microsoft, Inc.). FIG. 7 illustrates a file system dialogue box 700. To the left is a hierarchical arrangement of folders 702. Normally when a folder 706, such as "My Pictures," is selected, an individual list of pictures or thumbnails would be displayed on the right side. In this case a mind map 704 representing the files located in the folder 706 is displayed instead. This could be achieved by replacing the user interface element by using an application programming interface (API) hook to replace components of webDAV. In this case the mind map 704 is displayed instead.

Figure 8:
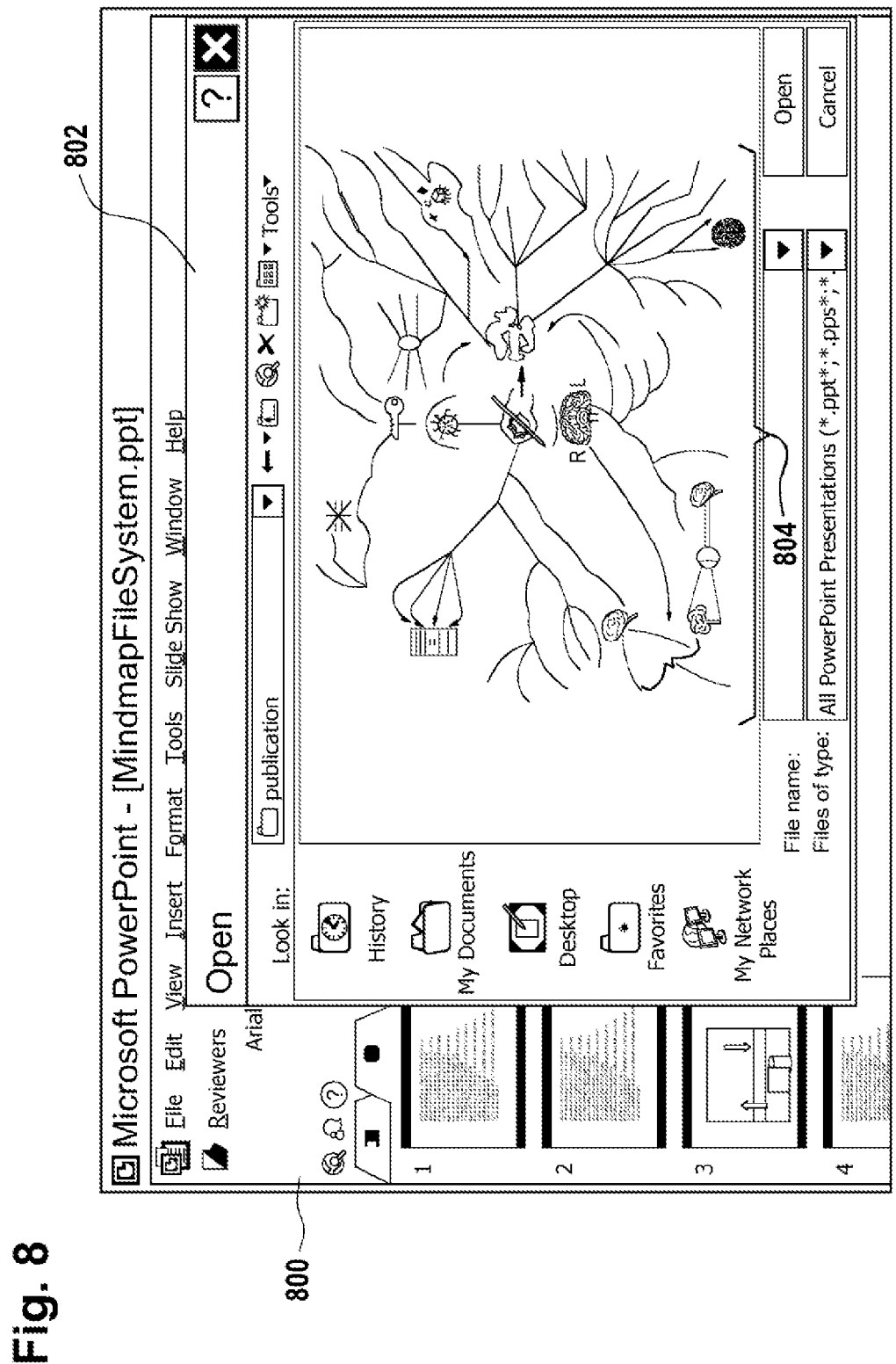
FIG. 8 illustrates a further embodiment of the invention integrated into Microsoft Windows.

FIG. 8 shows a similar example to that of FIG. 7. In FIG. 8 a dialogue box running Microsoft PowerPoint® (PowerPoint is a trademark of Microsoft, Inc.) 800 is illustrated. Files are opened within application files. In this case there is a second dialogue box 802 which is used for accessing or opening files for use within PowerPoint. In this case an API hook has been used to replace a list of files which are available to Microsoft PowerPoint with a mind map 804 of available PowerPoint files. This is another example of how an embodiment of the invention could be implemented in Microsoft Windows. The equivalent programming interfaces exist in other operating systems, such as Apple® OSX® (Apple and OSX are trademarks of Apple Computers) and Portable Operating System Interface (POSIX) based operating systems such as Sun SPARC® (SPARC is a trademark of SPARC International, Inc.) operating system and the Linux® (Linux is the registered trademark of Linus Torvalds) operating system. Embodiments of the invention may, therefore, be implemented in these and other operating systems as well.

The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method of graphically displaying relationships between content of a computer file system on a graphical user interface, comprising:
    gathering file system metadata using a processor, said file system metadata being descriptive of the computer file system, the computer file system comprising a plurality of files;
    gathering a set of file metadata using said processor, said set of file metadata comprising a description of each of said plurality of files;
    receiving a file selection from a user;
    determining a user context using said processor, wherein said user context comprises said file selected, a user profile, an application being used by said user, and file metadata of said file selected by said user, said file metadata comprising a description of a current task said user is performing;
    clustering the plurality of files into file clusters using the file system metadata, the set of file metadata, and the user context;
    mapping the set of file clusters with said processor onto a visualization model;
    graphically displaying the contents of the computer file system on the graphical user interface using said visualization model, wherein said graphical display depicts a relationship between contents of the computer file system at least partially based upon said user context;
    wherein the computer file system has a programming interface adapted for displaying file system information on the graphical user interface, and wherein the visualization model is graphically displayed on the graphical user interface by overriding the programming interface; and wherein the visualization model is at least one of a network visualization model, an orbital visualization model, and a mind map.

2. The method of claim 1, wherein the method further comprises:

recording file access times, the file access times being descriptive of when each of the plurality of files is accessed by the user; and generating temporal file clusters by clustering the plurality of files using the file access times.

3. The method of claim 1, further comprising receiving a search request from the user, and wherein the user context is at least partially determined by the search request.

4. The method of claim 1, wherein the graphical user interface comprises a context selection region, wherein the method further comprises receiving a context selection from the user, wherein the user context is determined at least partially by the context selection.

5. The method of claim 1, wherein the file metadata is gathered using a text analytic component.

6. The method of claim 1, wherein the graphical user interface comprises a graphical representation for each of the file clusters, wherein each of the file clusters has a set of similarities, wherein the graphical user interface is adapted to receive the selection of an element of the set of similarities by the user, wherein the method further comprises receiving the selection of the element from the user and altering the user context based at least partially on the element.

7. The method of claim 6, wherein the graphical user interface comprises a drop down box for selecting the element.

\* \* \* \* \*